(12) United States Patent
Bourdykina et al.

(10) Patent No.: US 7,018,240 B2
(45) Date of Patent: Mar. 28, 2006

(54) MOTOR ASSEMBLY OF X2Y RFI ATTENUATION CAPACITORS FOR MOTOR RADIO FREQUENCY INTERFERENCE (RFI) AND ELECTROMAGNETIC COMPATIBILITY (EMC) SUPPRESSION

(75) Inventors: Elena Bourdykina, London (CA); Bryan Todd Fisher, Appin (CA); Eric Bartlett, London (CA)

(73) Assignee: Siemens VDO Automotive Inc., Chatham (CA)

( * ) Notice: Subject to any disclaimer, the term of this patent is extended or adjusted under 35 U.S.C. 154(b) by 46 days.

(21) Appl. No.: 10/884,134

(22) Filed: Jul. 2, 2004

(65) Prior Publication Data

US 2005/0239331 A1    Oct. 27, 2005

Related U.S. Application Data

(60) Provisional application No. 60/564,558, filed on Apr. 22, 2004.

(51) Int. Cl.
*H01R 13/68* (2006.01)

(52) U.S. Cl. ..................................... 439/622
(58) Field of Classification Search .............. 439/622, 439/92; 310/239, 51
See application file for complete search history.

(56) References Cited

U.S. PATENT DOCUMENTS

| | | | |
|---|---|---|---|
| 5,196,750 A | 3/1993 | Strobl | 310/239 |
| 5,734,212 A | 3/1998 | Uffelman | 310/51 |
| 5,908,286 A * | 6/1999 | Clemmons | 417/44.2 |
| 6,307,344 B1 | 10/2001 | Pajak et al. | 318/629 |
| 6,768,243 B1 | 7/2004 | Yamazaki et al. | 310/239 |

OTHER PUBLICATIONS

X2Y Technology In Balance, "DC Motor Design with X2Y Technology", PCT/CA2004/002169 Jul. 9, 2004, Note #4001, V3.0, p. 1-17.
PCT International Search Report mailed May 11, 2005.
PCT Written Opinion, mailed May 11, 2005.

* cited by examiner

*Primary Examiner*—J. F. Duverne

(57) ABSTRACT

A connector structure for a brush motor includes a connector body 10 associated with the motor, an X2Y capacitor structure 20, a positive power terminal connection structure 14 associated, a negative power terminal connection structure 14' and a ground connection structure 16. The positive power terminal connection structure is electrically connected with the capacitor structure and is constructed and arranged to electrically engage a positive power terminal 18 of the motor. The negative power terminal connection structure 14' is electrically connected with the capacitor structure and is constructed and arranged to electrically engage a negative power terminal of the motor. The ground connection structure 16 is electrically connected with the capacitor structure and is constructed and arranged to be electrically connected with a ground mass. The X2Y capacitor structure provides RFI suppression.

24 Claims, 6 Drawing Sheets

MOTOR ASSEMBLY OF X2Y RFI ATTENUATION CAPACITORS FOR MOTOR RADIO FREQUENCY INTERFERENCE (RFI) AND ELECTROMAGNETIC COMPATIBILITY (EMC) SUPPRESSION

This application is based on U.S. Provisional Application No. 60/564,558, filed on Apr. 22, 2004, and claims the benefit thereof for priority purposes.

FIELD OF THE INVENTION

The invention relates to suppression of RFI for brush motors for automotive applications based on X2Y technology.

BACKGROUND OF THE INVENTION

Motor RFI Suppression is commonly completed by the use of a multitude wire wound inductors in series with the brushes and a film or ceramic capacitor in parallel to the power supply source.

An improved RFI suppression package, based on new technology of the X2Y component, is needed. Details of the X2Y can be found at http://www.x2y.com. An X2Y component is a four terminal device with unique architecture. X2Y is based on a standard bypass capacitor as a foundation provided with additional "reference" electrodes and two side terminations, called G1(ground) and G2, which are attached to the reference electrodes. Inserting parallel reference electrodes inside the bypass capacitor by dividing an unbalanced single end device, a balanced device is created. A balanced device is composed of two nominally identical halves.

The main benefits of balance are:

Two tight tolerance "Y" capacitors (1–2.5%);

Temperature variation effects elimination;

Voltage vs. capacitor variation becomes equalized line-to-line.

FIG. 1 shows a conventional X2Y component or capacitor 11 where two side terminations (G1 and G2) attached to the reference electrodes results in acquiring one package consisting of the three capacitors. Cx is a capacitor between power lines and Cy is a capacitor between one power line and ground. The X2Y configuration is similar to a dual rectangular coaxial structure. An internal Faraday cage forms a shielded container for each conductor (+Bat and –Bat) inside the capacitor. At high frequency, the circuit noise in each capacitor will choose the low impedance path of the shield and opposing noise current will be cancelled. Inside the X2Y component, every other layer within the single component body is in opposition to cancel the magnetic fields. The components circuit inside operates simultaneously in multi-modes (Common and Differential Mode Noise Coupling).

X2Y components reduce Electro-magnetic Interference (EMI) by means of field cancellation. By contrast, standard components are using capacitance to shunt noise or inductors to block noise with high impedance.

X2Y components are in by-pass and effectively filtering only the noise. Because they are in by-pass X2Y components do not heat up like standard components.

The way the X2Y component is attached and placed can have major effects on how well it performs. Some special study and experimental research have been done to get maximum broadband filtering performance.

There is a need to provide an X2Y capacitor in a motor connector for Radio Frequency Interference (RFI) suppression.

SUMMARY OF THE INVENTION

An object of the invention is to fulfill the need referred to above. In accordance with the principles of the present invention, this objective is achieved by providing a connector structure for a brush motor. The connector structure includes a connector body associated with the motor. An X2Y capacitor structure is provided. A positive power terminal connection structure is associated with the connector body and is electrically connected with the capacitor structure and is constructed and arranged to electrically engage a positive power terminal of the motor. A negative power terminal connection structure is also associated with the connector body. The negative power terminal connection structure is electrically connected with the capacitor structure and is constructed and arranged to electrically engage a negative power terminal of the motor. A ground connection structure is electrically connected with the capacitor structure and is constructed and arranged to be electrically connected with a ground mass.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
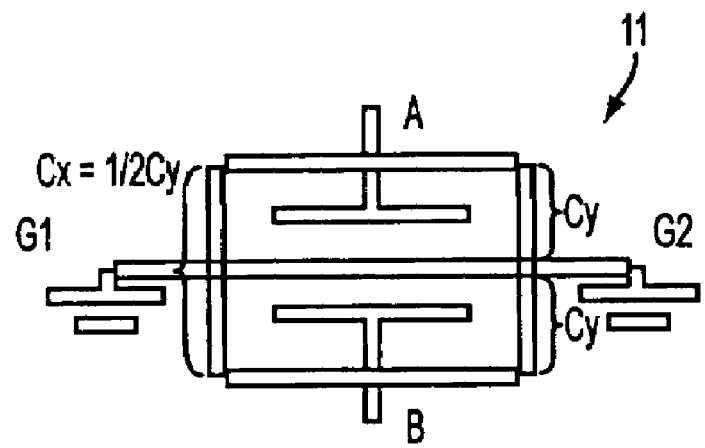
FIG. 1 is a schematic illustration of a conventional X2Y capacitor.
Figure 2:
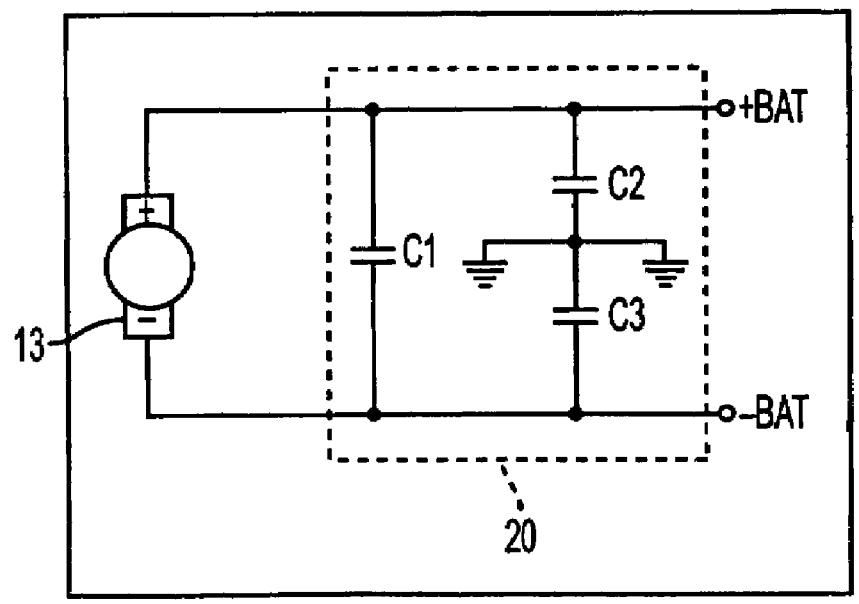
FIG. 2 is a circuit diagram showing the electrical position of a X2Y capacitor relative to a motor in accordance with the invention.

The present invention utilizes the X2Y technology to for motor RFI suppression. The mechanical assembly of such a balanced line electromagnetic interference (EMI) chip is not intuitive to meet the requirements of automotive environments and low cost assembly. The embodiment details a mechanical structure to package a capacitor into a motor connector body and utilizes low cost assembly techniques and components. The X2Y capacitor is small in size relative to the components of the assembly and is difficult to fit without utilizing tradition printed circuit board techniques. The X2Y capacitor is relatively new to the motor industry and the details of the incorporating the X2Y capacitor into a motor connector are described below. FIG. 2 is a circuit diagram showing the electrical position of a X2Y capacitor 20 relative to a motor 13 in accordance with the invention.

Figure 3:
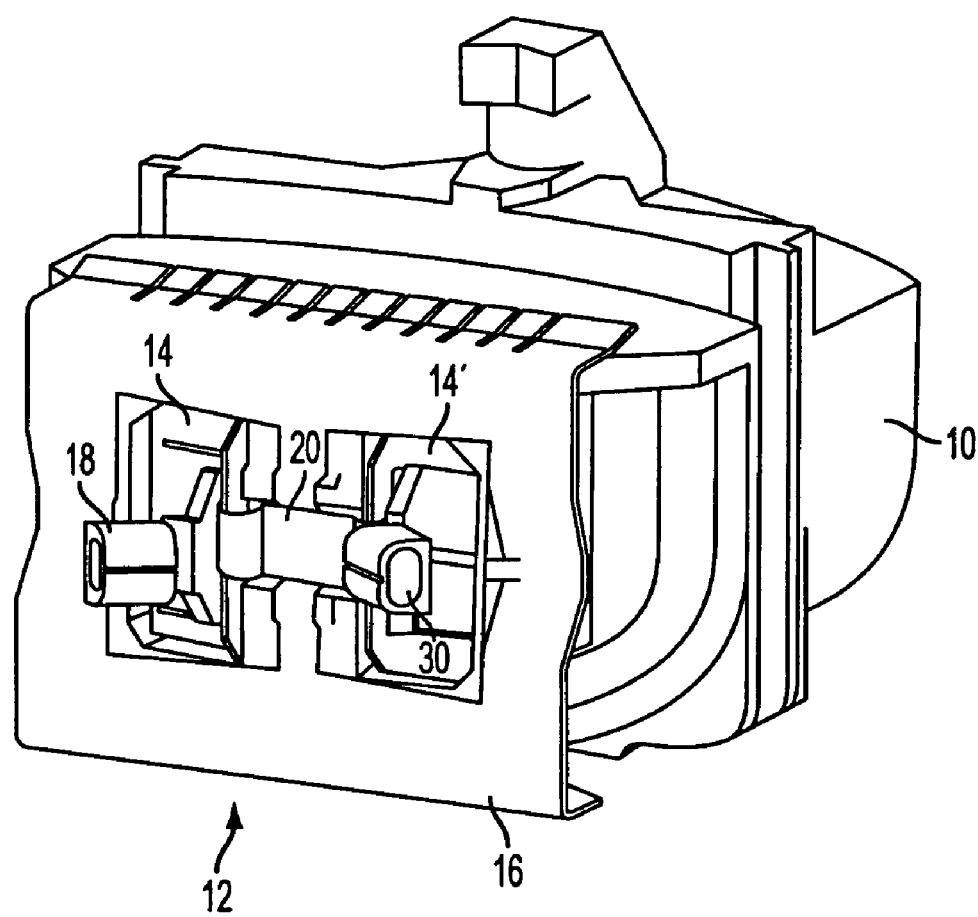
FIG. 3 is a perspective view of an X2Y capacitor mounting assembly shown coupled with a motor connector body in accordance with the invention.

With reference to FIG. 3, a motor connector body 10 is shown including an X2Y capacitor mounting assembly, generally indicated at 12, in accordance with the principles of the invention. The assembly 12 includes three conductive components manufactured by a sheet metal forming operation and a conventional X2Y capacitor 20. The three conductive components include a positive power terminal connection component 14, a negative power terminal connection component 14' and a ground connection component 16.

Figure 6:
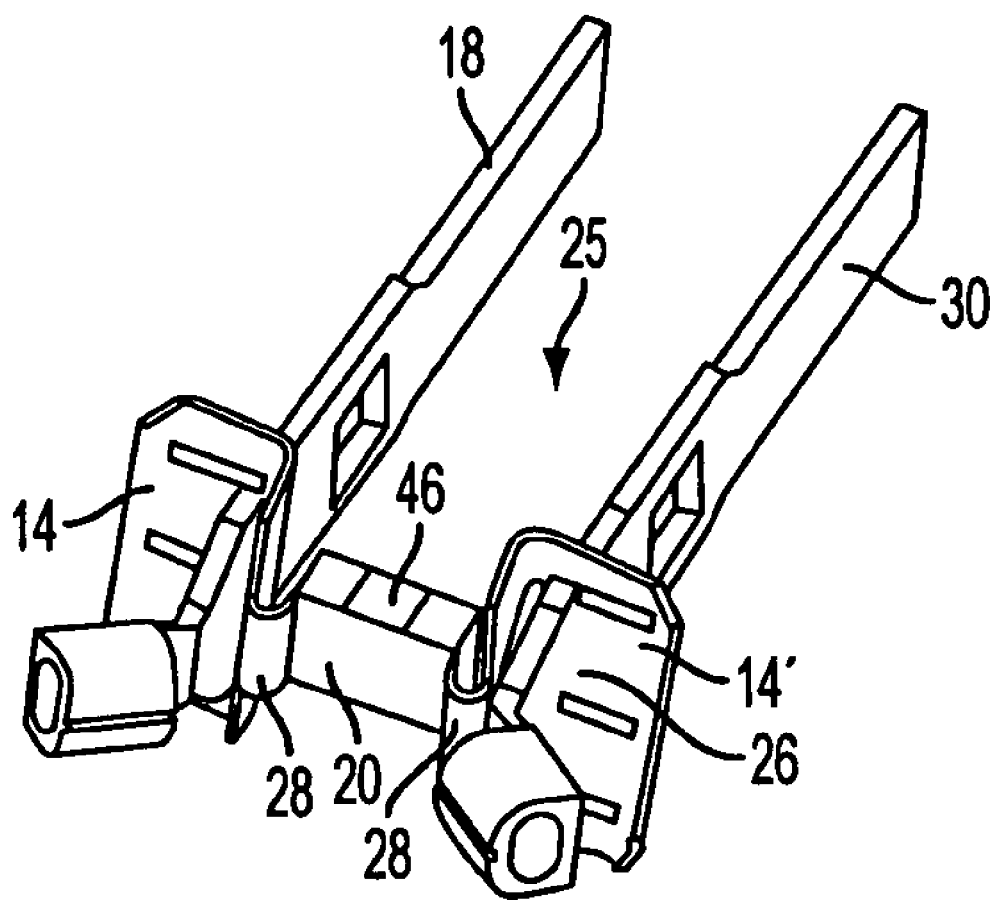
FIG. 6 is a perspective view of the X2Y capacitor mounting assembly of FIG. 4 shown with the power terminals attached thereto and without the ground component attached.
Figure 7:
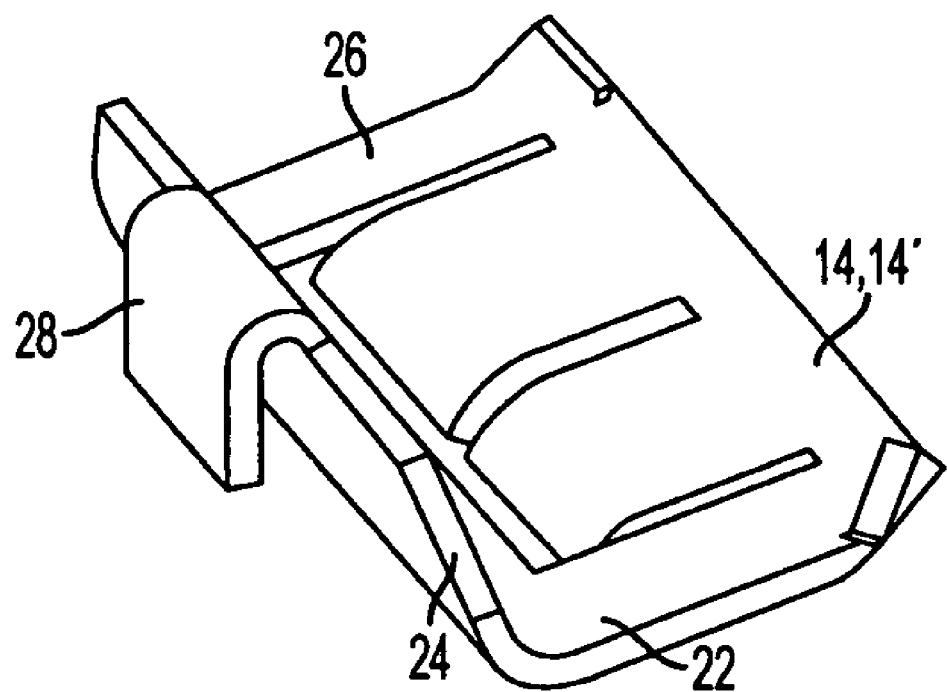
FIG. 7 is a perspective view of a power terminal connection component of the X2Y capacitor mounting assembly of FIG. 4.

FIG. 7 shows a power connection component 14 that is substantially identical to component 14'. The positive and negative power terminal connection components 14, 14' are each preferably a stamped component that surrounds the associated power terminal. Thus, component 14 surrounds the positive power terminal 18 and component 14' surrounds the negative power terminal 30 (FIG. 6). The power terminal connection components 14, 14' have a mechanical interference spring connection and/or solder connection to the associated terminal 18, 30 and have a mechanical or solder connection to the X2Y capacitor 20. In the illustrated embodiment, each component 14, 14' includes a main body 22 bent to have an upstanding portion 24. The body 22 includes first spring structure 26 constructed and arranged to resiliently engage an associated terminal 18, 30. The upstanding portion 24 includes a second spring structure 28 constructed and arranged to resiliently engage the generally rectangular X2Y capacitor 20 in space 25 between the two components 14 and 14' (FIG. 6). Components 14, 14' are preferably made of a conductive material capable of carrying low currents such as phosphor bronze or beryllium copper or copper or brass.

The components 14, 14' are preferably mechanically fit onto the motor connector 10 and held thereon by the means of an interference clip on the component 14, 14' or by a clip on the connector 10. Surrounding the positive and negative power terminals with component 14 and component 14', respectively, prevents noise from bypassing the X2Y capacitor 20 and suppresses noise in the nearest proximity to the noise source (motor's brushes).

Figure 4:
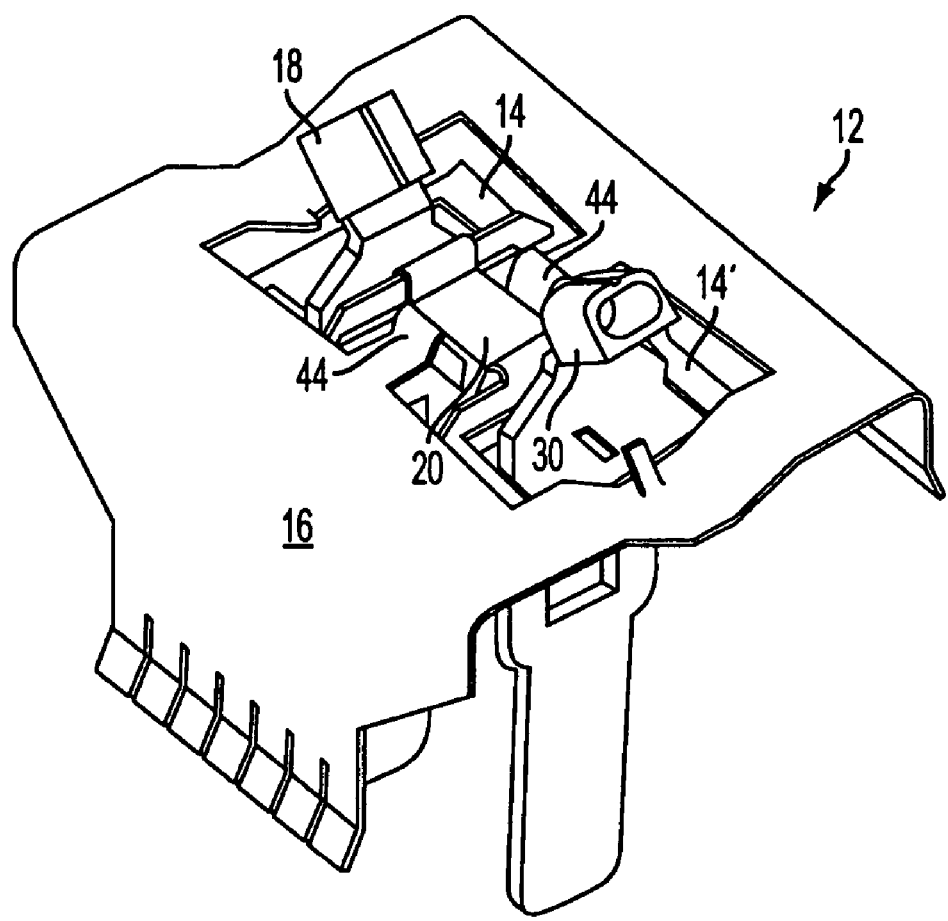
FIG. 4 is a perspective view of the X2Y capacitor mounting assembly of FIG. 3 showing the power terminals attached thereto.
Figure 5:
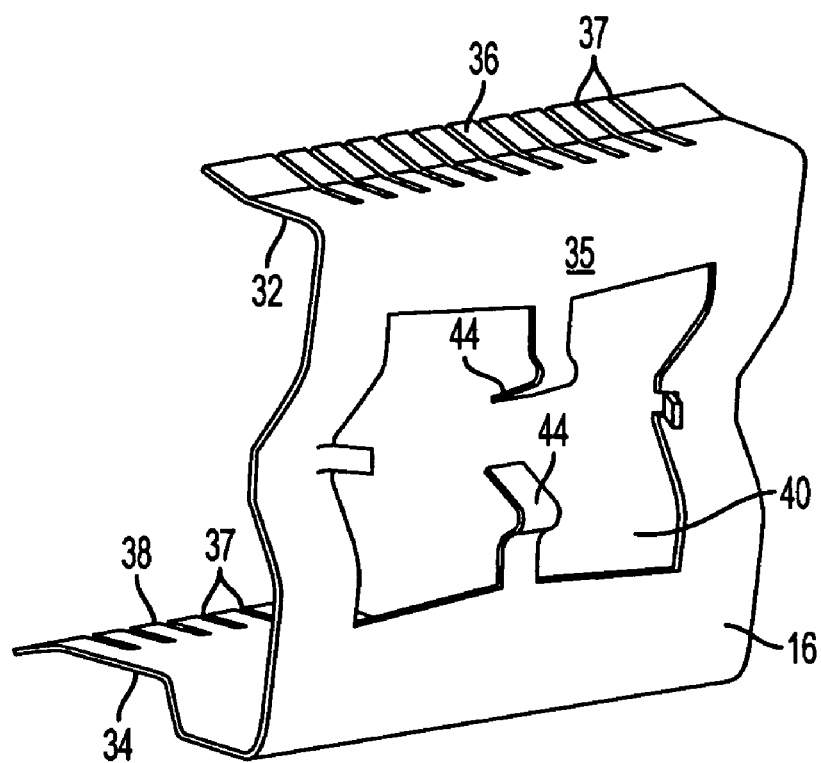
FIG. 5 is a perspective view of a ground connection component of the X2Y capacitor mounting assembly of FIG. 4.

With reference to FIG. 3–5, the ground connection component 16 is preferably a stamped component that surrounds, without contacting, both the positive and negative power connection components, 14, 14'. Component 16 has a mechanical interference spring connection and/or solder connection to the X2Y capacitor 20. In the illustrated embodiment, the component 16 includes a main body that is stamped into a generally U-shaped configuration defining two opposing sides 32, 34 joined by a central portion 35. Each side 32, 34 includes spring structure 36 in the form of a plurality of spring tabs 37. The component 16 is constructed and arranged so that it can be placed over a portion of the motor connector 10 with the spring structure 36 engaging a portion of the connector 10. The small spring tabs 37 provide an overall low inductance multiple ground connection to the ground mass and reduces parasitic inductance of that connection. The ground connection can be made to the end cap, stator or motor mounting flange. The multiple parallel connections to ground reduce the total inductance between the X2Y capacitor 20 and ground.

In the embodiment, the central portion 35 of the component 16 includes an opening 40 for receiving the component 14, 14' and the X2Y capacitor 20. To provide ground contact with the X2Y capacitor, the central portion 35 includes opposing spring contacts 44 that extend into the opening and resiliently contact ground areas 46 (FIG. 6) of the X2Y capacitor 20. Of course, instead of or in combination with the spring contacts 44, a solder connection can be made in two places with the X2Y capacitor 20. Component 16 is preferably made of a conductive material capable of carrying low currents such as phosphor bronze or beryllium copper or copper or brass. The component 16 is mechanically fit onto the motor connector 10 and is held on by the means of an interference clip on the component 16 or clip on the connector 10.

A function of the component 16 is to bypass High Frequency such as, for example, 70 MHz-108 MHz noise. Therefore, the area of the ground connection has to be large to minimize total impedance of component 16. The X2Y capacitor 20 connects to the component 16 at two points via contacts 44 in order to decrease internal X2Y inductance. All connections should be as short and wide as possible to reduce impedance.

Components 14, 14' and component 16 form a mechanical socket that permits ease of assembly of the X2Y capacitor 20.

Utilizing stampings for the circuit connections and incorporating them into the motor connector 10 is a feature of the embodiment. The assembly can be assembled using automation or manual assembly utilizing low cost components.

This invention can be use on any motor with a multitude of poles, and brushes and will be placed near the input power source.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A connector structure for a brush motor, comprising:
a connector body associated with the motor,
an X2Y capacitor structure,
a positive power terminal connection structure associated with the connector body, the positive power terminal connection structure being electrically connected with the capacitor structure and being constructed and arranged to electrically engage a positive power terminal of the motor,
a negative power terminal connection structure associated with the connector body, the negative power terminal connection structure being electrically connected with the capacitor structure and being constructed and arranged to electrically engage a negative power terminal of the motor, and
a ground connection structure being electrically connected with the capacitor structure and being constructed and arranged to be electrically connected with a ground mass.

2. The connector structure of claim 1, wherein the ground connection structure electrically connects to the capacitor structure at two different locations.

3. The connector structure of claim 1, wherein the ground connection structure is a stamping of electrically conductive material of generally U-shaped configuration defining two opposing sides joined by a central portion, the two opposing sides engaging a portion of the connector body.

4. The connector structure of claim 3, wherein each side includes a plurality of spring tabs constructed and arranged to engage the ground mass.

5. The connector structure of claim 3, wherein the central portion includes an opening constructed and arranged to receive the positive power terminal connection structure, the negative power terminal connection structure, and the capacitor structure.

6. The connector structure of claim 5, wherein the central portion includes opposing spring contacts that extend into the opening and resiliently contact ground areas of the capacitor structure.

7. The connector structure of claim 1, wherein the positive and negative power terminal connection structures are stampings of electrically conductive material disposed to define a space there-between, the capacitor structure being mounted in said space.

8. The connector structure of claim 7, wherein each of the positive power terminal connection structure and negative power terminal connection structure includes a main body having first spring structure constructed and arranged to resiliently engage an associated power terminal of the motor, and second spring structure constructed and arranged to resiliently engage the capacitor structure in the space.

9. The connector structure of claim 8, wherein the ground connection structure includes an opening constructed and arranged to receive the positive power terminal connection structure, the negative power terminal connection structure, and the capacitor structure, and wherein the ground connection structure includes opposing spring contacts that extend into the opening.

10. The connector structure of claim 9, wherein the capacitor structure is generally rectangular and the second spring structure of the positive power terminal connection structure engages one side of the capacitor structure, the second spring structure of the negative power terminal connection structure engages a side of the capacitor structure opposite the one side, and the spring contacts of the ground connection structure engage remaining sides of the capacitor structure.

11. The connector structure of claim 1, wherein the positive and negative power terminal connection structures are configured substantially identically.

12. An assembly for a motor, the assembly comprising:
an X2Y capacitor structure,
a positive power terminal connection structure being electrically connected with the capacitor structure and being constructed and arranged to electrically engage a positive power terminal of the motor,
a negative power terminal connection structure being electrically connected with the capacitor structure and being constructed and arranged to electrically engage a negative power terminal of the motor, and
a ground connection structure being electrically connected with the capacitor structure and being constructed and arranged to be electrically connected with a ground mass.

13. The assembly of claim 12, wherein the ground connection structure electrically connects to the capacitor structure at two different locations.

14. The assembly of claim 12, wherein the ground connection structure is a stamping of electrically conductive material of generally U-shaped configuration defining two opposing sides joined by a central portion, the two opposing sides being constructed and arranged to engage a connector body of the motor.

15. The assembly of claim 14, wherein each side includes a plurality of spring tabs constructed and arranged to engage the ground mass.

16. The assembly of claim 14, wherein the central portion includes an opening constructed and arranged to receive the positive power terminal connection structure, the negative power terminal connection structure, and the capacitor structure.

17. The assembly of claim 16, wherein the central portion includes opposing spring contacts that extend into the opening and resiliently contact ground areas of the capacitor structure.

18. The assembly of claim 12, wherein the positive and negative power terminal connection structures are stampings of electrically conductive material disposed to define a space there-between, the capacitor structure being mounted in said space.

19. The assembly of claim 18, wherein each of the positive power terminal connection structure and negative power terminal connection structure includes a main body having first spring structure constructed and arranged to resiliently engage an associated power terminal of the motor, and second spring structure constructed and arranged to resiliently engage the capacitor structure in the space.

20. The assembly of claim 19, wherein the ground connection structure includes an opening constructed and arranged to receive the positive power terminal connection structure, the negative power terminal connection structure, and the capacitor structure, and wherein the ground connection structure includes opposing spring contacts that extend into the opening.

21. The assembly of claim 20, wherein the capacitor structure is generally rectangular and the second spring structure of the positive power terminal connection structure engages one side of the capacitor structure, the second spring structure of the negative power terminal connection structure engages a side of the capacitor structure opposite the one side, and the spring contacts of the ground connection structure engage remaining sides of the capacitor structure.

22. The assembly of claim 12, wherein the positive and negative power terminal connection structures are configured substantially identically.

23. A connector structure for a brush motor, comprising:
a connector body associated with the motor,
an X2Y capacitor structure,
first means, associated with the connector body, for electrically connecting with the capacitor structure and for electrically engaging a positive power terminal of the motor,
second means, associated with the connector body, for electrically connecting with the capacitor structure and for electrically engaging a negative power terminal of the motor, and
third means for electrically connecting with the capacitor structure and for electrically connecting with a ground mass.

24. The connector structure of claim 23, wherein the third means electrically connects to the capacitor structure at two different locations.

* * * * *